UNITED STATES PATENT OFFICE.

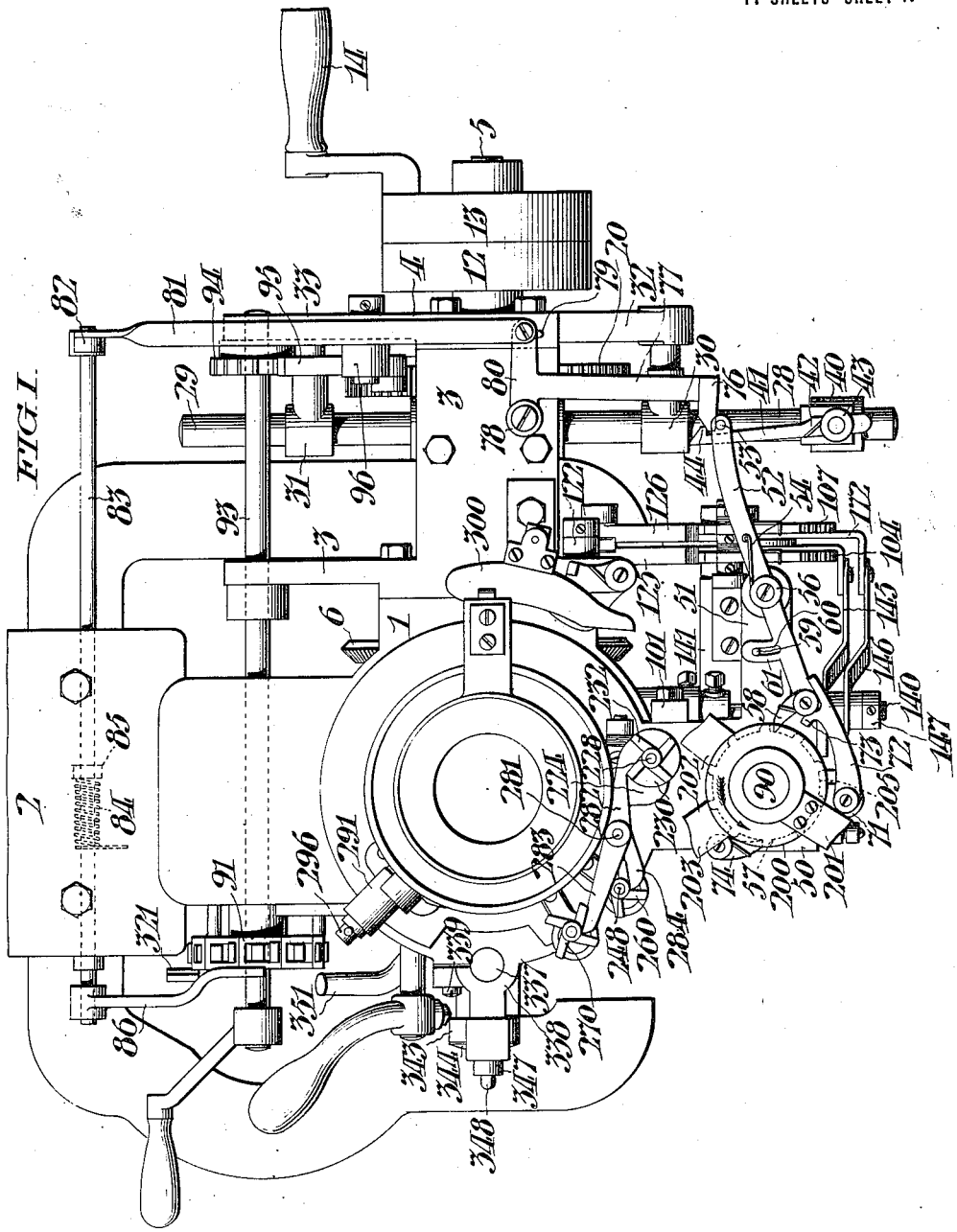

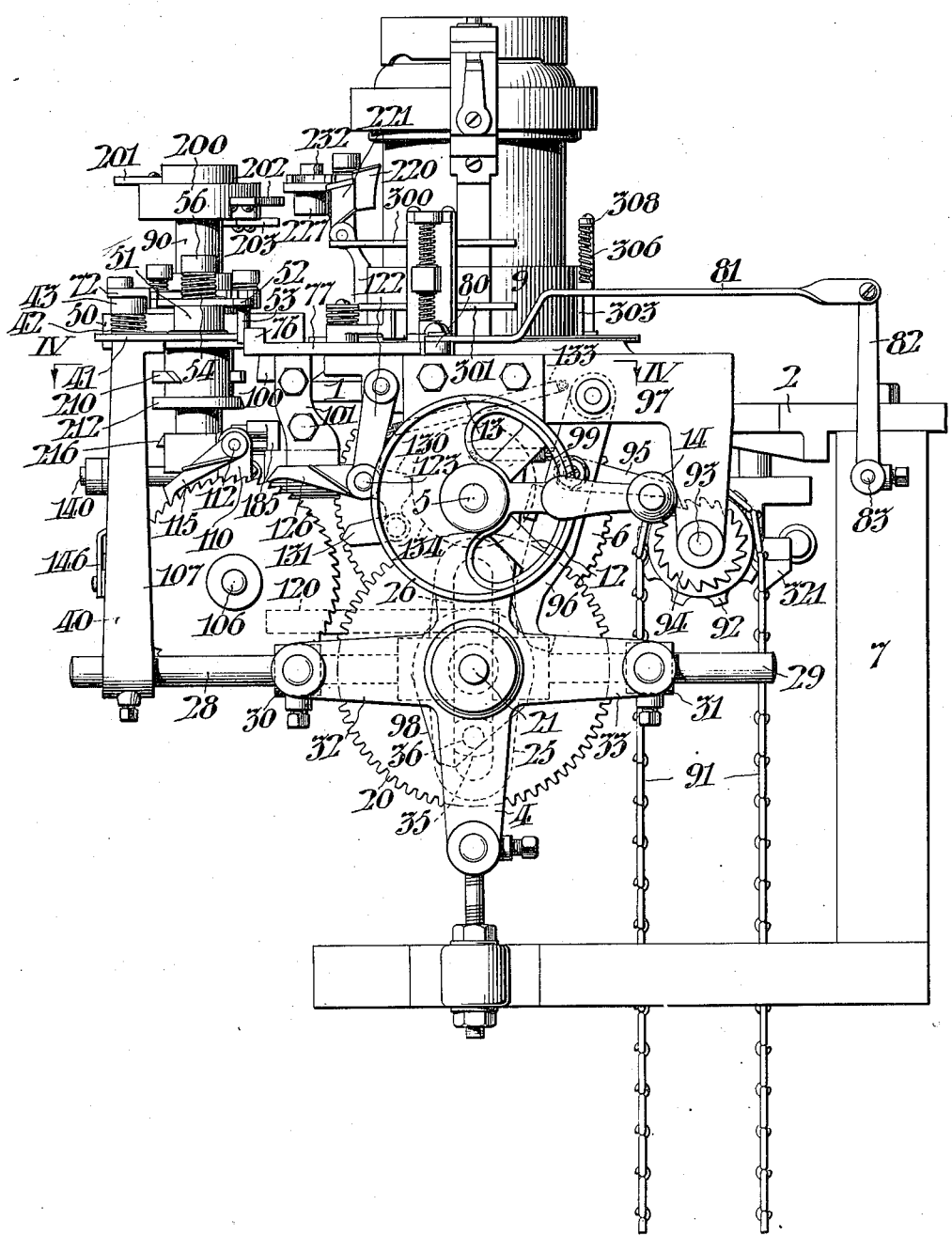

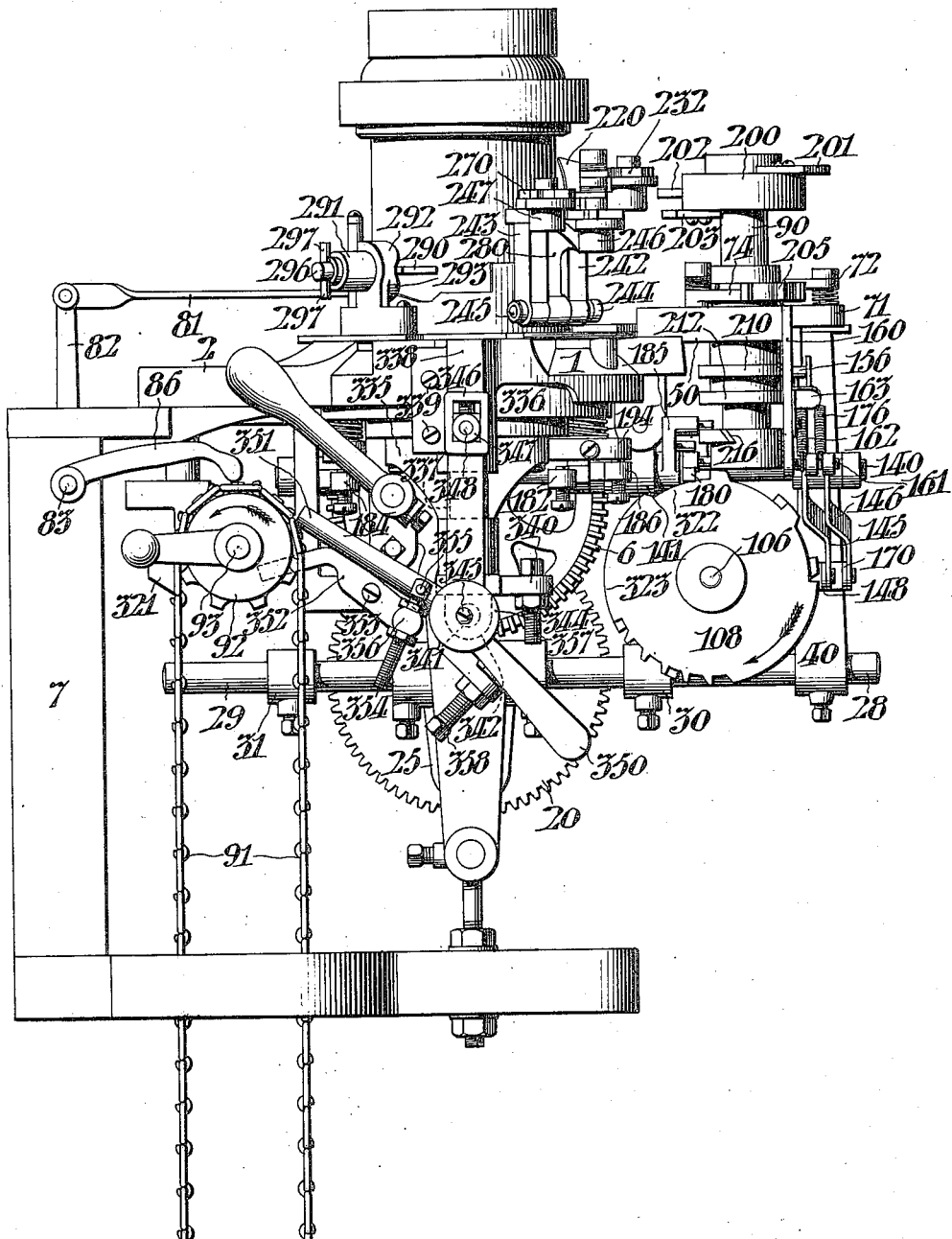

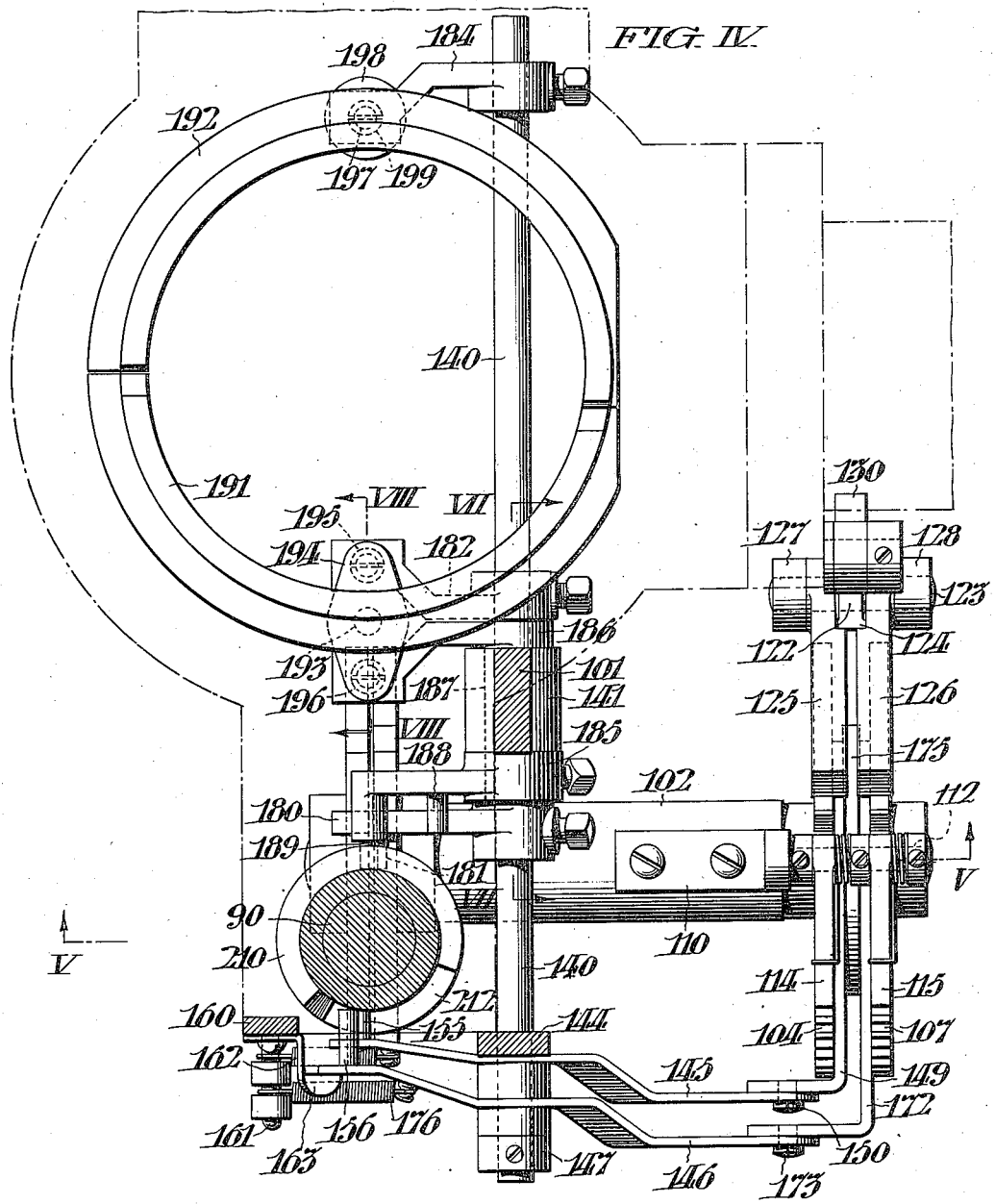

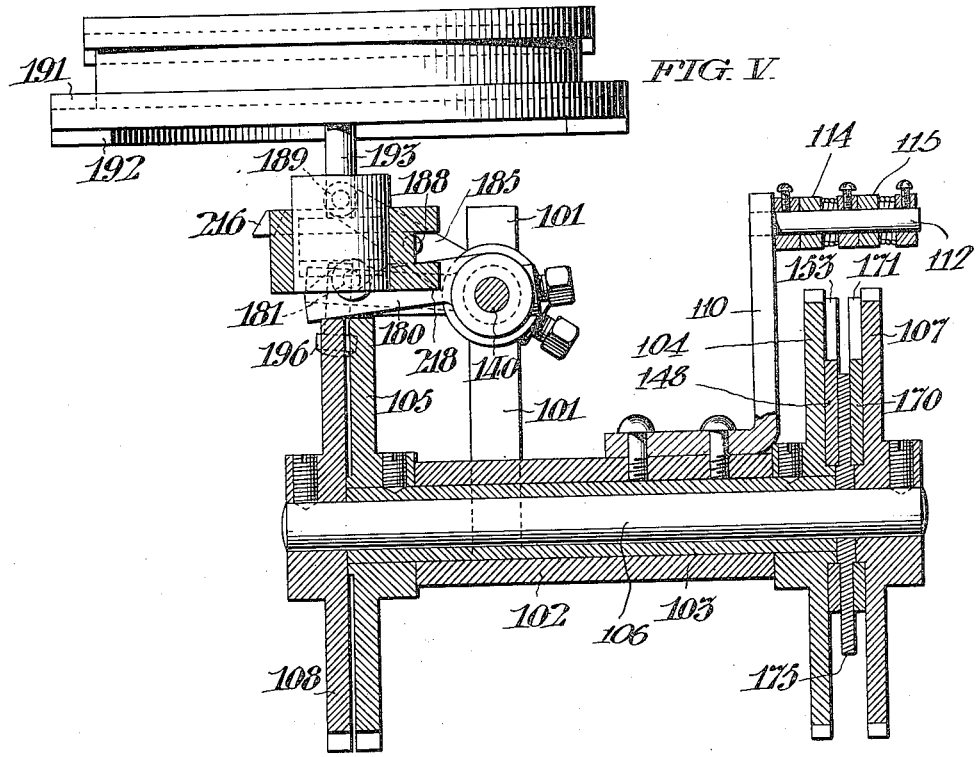
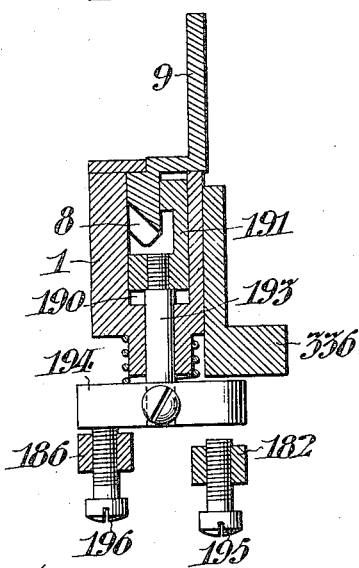

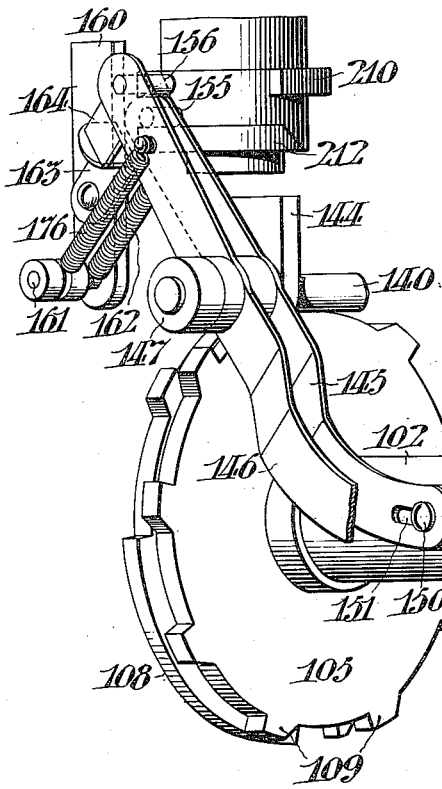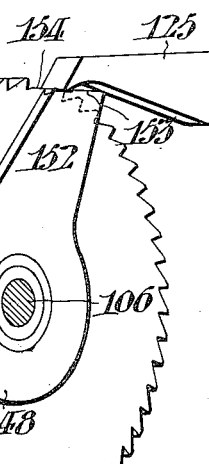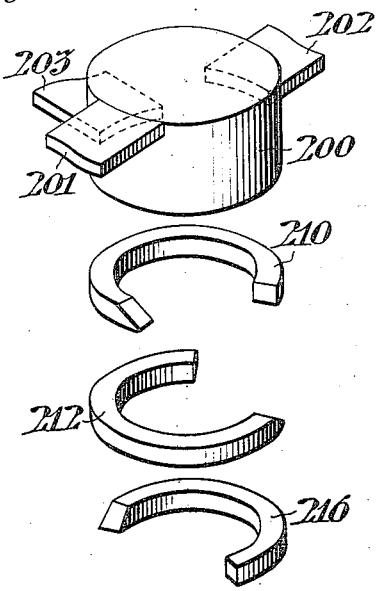

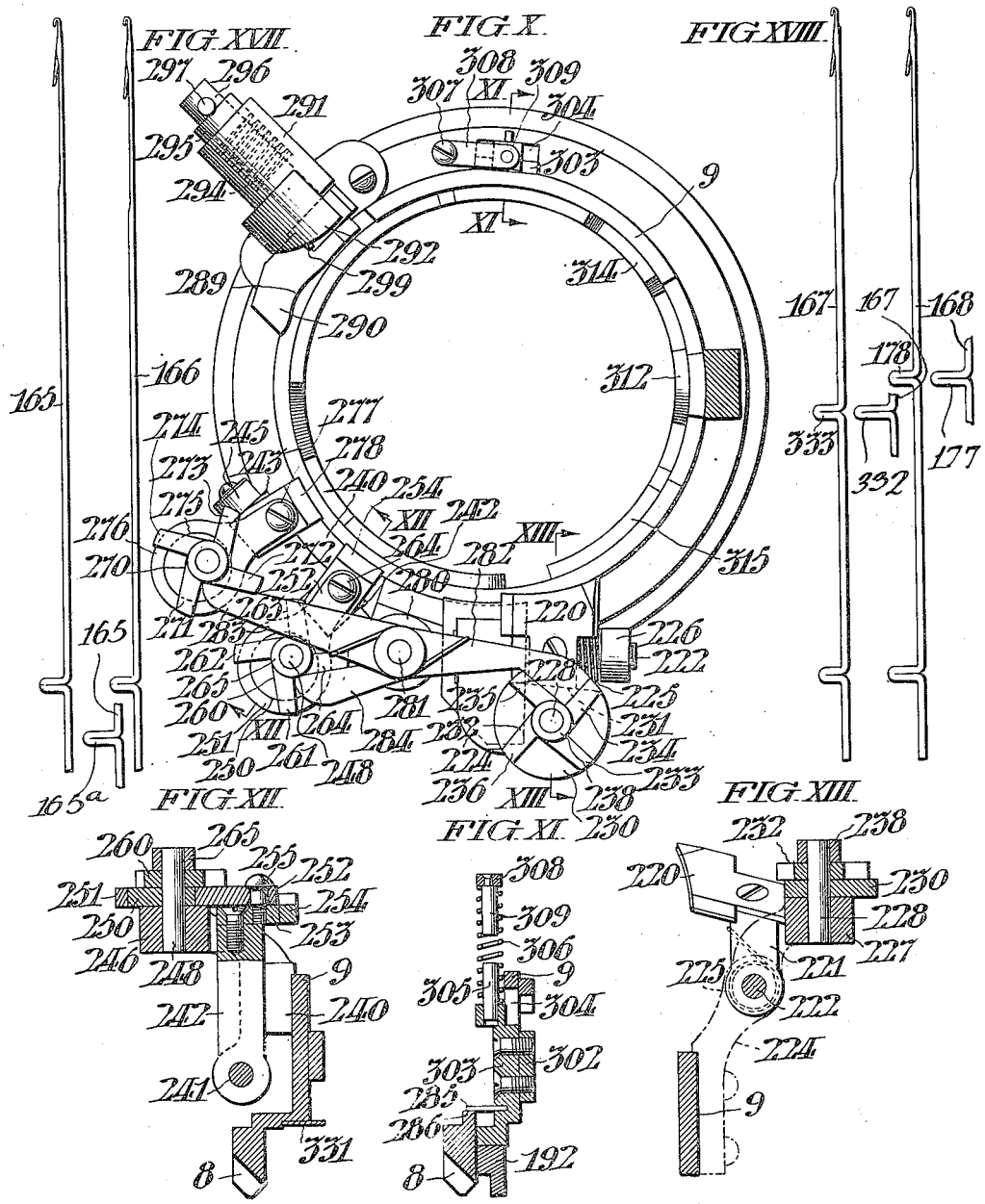

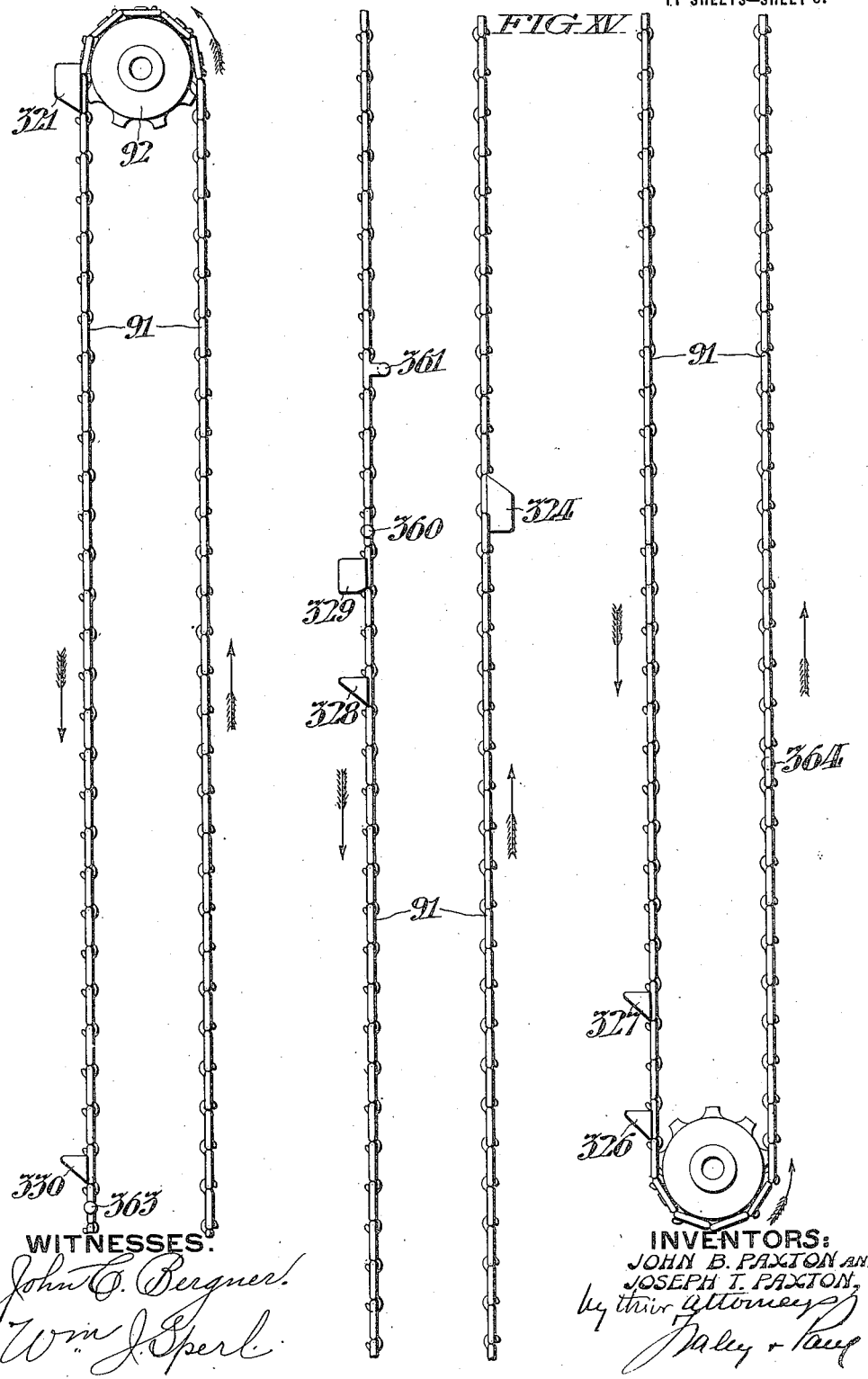

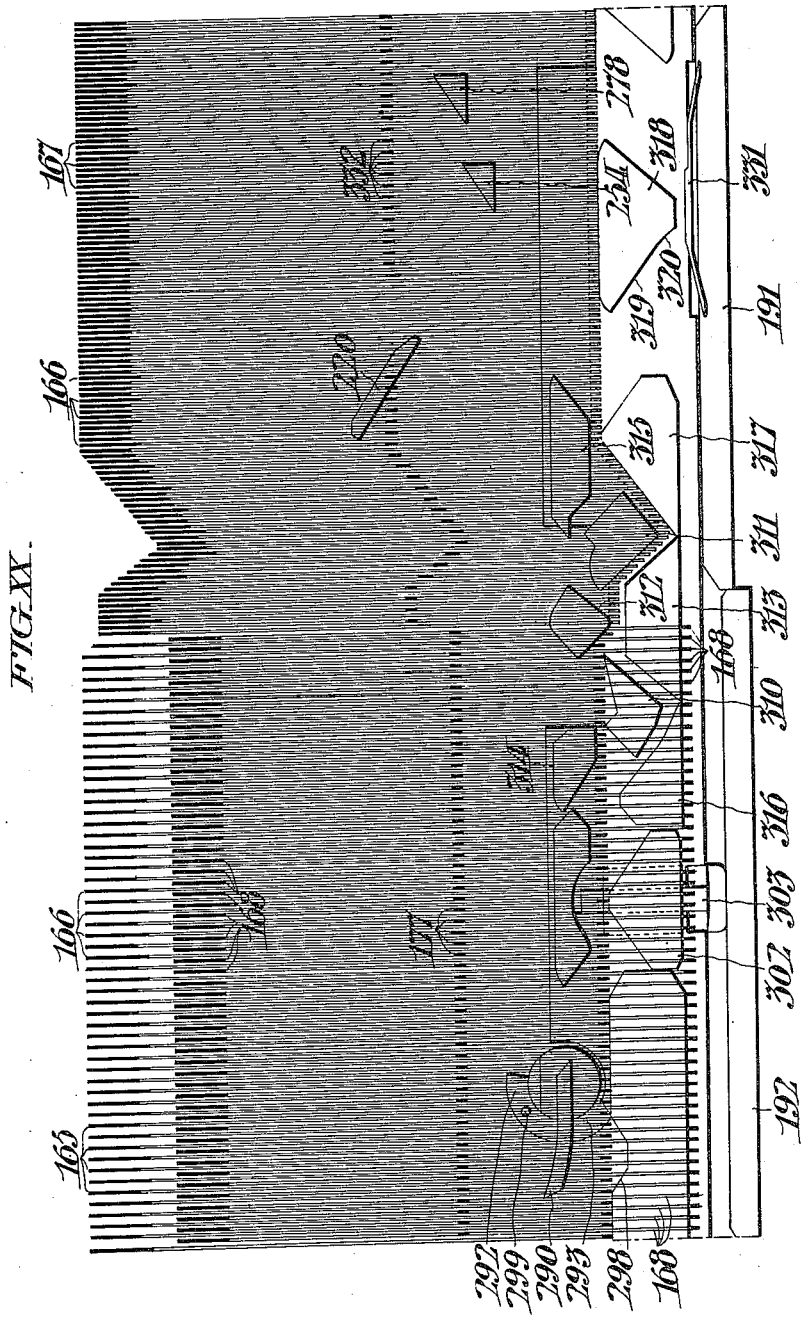

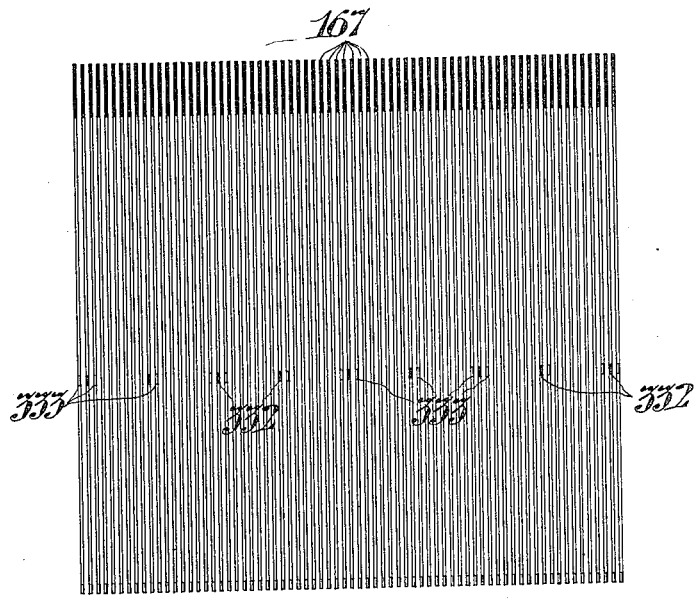

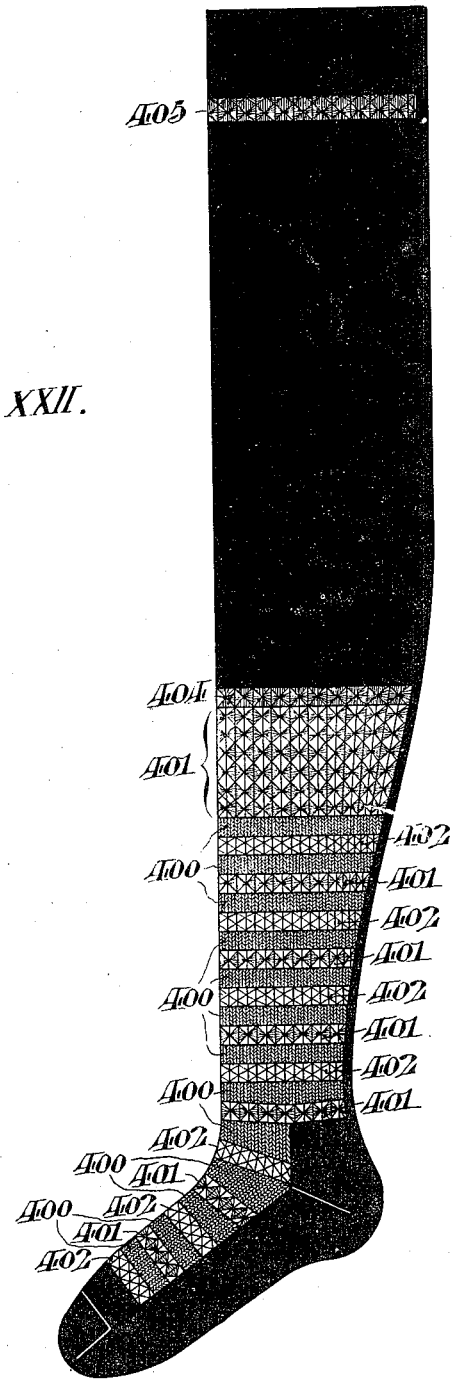

JOHN B. PAXTON AND JOSEPH T. PAXTON. OF PHILADELPHIA, PENNSYLVANIA; SAID JOSEPH T. PAXTON ASSIGNOR TO ELLIS I. O'NEILL, OF PHILADELPHIA, PENNSYLVANIA.

KNITTING-MACHINE.

1,140,709.     Specification of Letters Patent.     Patented May 25, 1915.

Application filed March 12, 1908. Serial No. 420,752.

*To all whom it may concern:*

Be it known that we, JOHN B. PAXTON and JOSEPH T. PAXTON, of Philadelphia, in the county of Philadelphia and State of Pennsylvania, have invented certain new and useful Improvements in Knitting-Machines, whereof the following is a specification, reference being had to the accompanying drawings.

Our invention relates to automatic circular stocking knitting machines and has for its object the production of a machine to automatically knit tuck-work, and open-work in addition to plain knitting.

The herein described mechanism is adapted to be used with well known automatic circular stocking knitting machines.

One object of this invention is to provide a machine which will knit open-work, or tuck-work, or both on the upper portion of the foot of a stocking, while producing plain knitting upon the lower portion of the foot. In its present embodiment we provide two half-rings which control a tucking cam, and said half rings may be operated simultaneously or independently by suitable pattern mechanism.

A further object is to provide means coöperating with a pull down cam to jar the needles to open their latches.

In the accompanying drawings, Figure I, is a plan view. Fig. II, is an elevation looking from the right of Fig. I. Fig. III, is an elevation looking from the left of Fig. I. Fig. IV, is a plan sectional view taken on the line IV, IV, in Fig. II, showing only those parts which constitute the pattern mechanism. Fig. V, is a section taken on the line V, V, in Fig. IV. Fig. VI, is a sectional perspective view of the mechanism which controls the pawling of the ratchet wheels on the pattern wheel shaft. Fig. VII, is a fragmentary sectional view taken on the line VII, VII, in Fig. IV. Fig. VIII, is a fragmentary sectional view taken on the line VIII, VIII, in Fig. IV, showing one of the cam rings in its upper position in the bed plate of the machine. Fig. IX, is a diagrammatic perspective view of the cams on the vertical shaft or controlling stem. Fig. X, is a plan of the cam cylinder and the parts which it carries. Fig. XI, is a sectional view on the line XI, XI, in Fig. X, through the tucking cam. Fig. XII, is a section on the line XII, XII, in Fig. X. Fig. XIII, is a sectional view on the line XIII, XIII, in Fig. X. Fig. XIV, is a plan view of one of the star wheels showing its two inward positions and the relation of the needles to them. Fig. XV, is an elevation of the measuring chain. Fig. XVI, is an elevation of a single-butt short latch needle also showing a section of a long butt needle. Fig. XVII, is a similar view of a long-latch needle employed in making tuck stitches. Fig. XVIII, shows an elevation of a double-butt needle employed in knitting the back half of the stocking, also showing a section of a needle having a long upper butt. Fig. XIX, is a similar view of a double-butt needle employed in knitting the front half of the stocking, and which are arranged to be thrown out of action to make open-work, also showing a section of a needle with a long upper butt. Fig. XX, is a development of the entire cam cylinder showing the needles in the positions that they would assume in knitting the foot of a stocking. Fig. XXI, is a diagrammatic view showing a modified arrangement of the double-butt needles having long and short upper butts for knitting two and three drop stitch work. Fig. XXII is a plan view showing a stocking knit on the improved machine.

In order that the drawings may be more easily understood, it will be convenient to first enumerate and refer to the fixed parts by which the mechanism proper is supported and then divide the description into sections, as follows: I. Pawling mechanism for the controlling stem. II. Controlling stem. III. Pattern wheels and pawling mechanism therefor. IV. Mechanism for controlling the half rings. V. Cam mechanism for the double butt needles. VI. Cam mechanism for controlling needles at formation of heel and toe pockets. VII. Tucking cam.

In said figures, 1, is the bed plate having the rearwardly projecting supporting leaf 2, and depending bearing frames 3, and 4, which latter are arranged to support the motion changing mechanism. Said mechanism comprises the main shaft 5, having the bevel gear 6, engaging the gear 8, on the cam cylinder 9. The details of the motion changing mechanism are not shown in this application since they form no part of our present invention. The shaft 5, is provided with tight and loose pulleys 12, and 13, the latter having the usual handle 14. A pinion on the shaft 5, engages the gear 20, which rotates on the stationary stud 21, in the frame 4.

*I. Pawling mechanism for the controlling stem.*—The yoke 25, Fig. II, having the slot 26, comprises the alined slide bars 28, and 29, arranged to slide in adjustable guides 30, and 31, which are rigidly secured in the arms 32, and 33, on the frame 4. Said yoke is arranged to be reciprocated by the engagement of its slot 26, with the slide block 35, on the crank pin 36, carried by the gear 20, and the reciprocation of said yoke 25, is imparted to the slide bars 28, and 29, for a purpose to be hereinafter set forth. To one end of the slide bar 28, is secured the arm 40, having pivoted at its upper end the finger 41, Figs. I and II which is pressed by a spring 42, of which the tension may be varied by means of the adjustable collar 43, to which one end of said spring is secured.

Bolted to the front end of the bed plate 1, is the plate 50, having a laterally extending arm 51. Upon the outer end of the arm 51, is pivotally mounted the lever 52, having a depending stud 53, adapted to be engaged by the hook 44, on the finger 41. The lever 52, is normally maintained in the position shown in Fig. I, by the coiled spring 54, having one end attached to the adjustable collar 56. Upon the left hand end of lever 52 is mounted the spring pressed pawl 58, adapted to engage teeth 57, on the disk 205, on the controlling stem 90. The movement of the lever 52, under the influence of spring 54, is limited by the pin 59, contained within the slot 60, in the lug 61, on said lever 52. Mounted on the lug 71, formed on plate 50, is the pivoted spring pressed safety catch 72. This catch follows up the pawl 58, when the controlling stem 90, is turned by the engagement of said pawl 58, with a tooth on said stem, and the projection 73, on said catch 72, engages the front face of the second tooth 57, succeeding that engaged by the pawl 58, and prevents said pawl from moving said stem too far. To prevent the controlling stem from turning backward the locking pawl 74, is provided, said pawl being spring pressed and pivotally mounted upon the plate 50.

To prevent the hook 44, from engaging the stud 53, except at predetermined intervals, the cam 76, is provided. Said cam 76, is located on one end of the bell crank lever 77, pivoted about the stud 78, which is screwed into the bearing frame 3. The backward movement of the lever 77, is limited by the pin 79. The arm 80, of the bell crank lever 77, is connected by the link 81, with the rocker arm 82, secured to the rock shaft 83. Said rock shaft 83, is journaled in struts 7, secured to the supporting leaf 2. About said rock shaft 83, is coiled a spring 84, having one end secured to a collar 85, on said shaft and its other end engaging the under side of the supporting leaf 2. Upon the left hand end of said rock shaft 83, is the arm 86, adapted to be engaged by various high links on the measuring chain 91, for purposes to be hereinafter described.

The pattern chain 91, engages the sprocket wheel 92, which is secured to the countershaft 93, journaled in brackets secured to the supporting leaf 2. Upon said countershaft 93, is the ratchet wheel 94, which is rotated by the pawl 95, pivoted to the tappet arm 96. The tappet arm 96, is pivoted at its upper end to the bracket 97, secured to the supporting frame 4. The lower end of said tappet arm 96, is adapted to be engaged by the cam 98, which is carried by the gear 20. The tappet arm 96, is held in engagement with said cam 98, by the coiled spring 99. In the present machine the rotation of the gearing is such that the ratchet wheel 94, is moved one tooth when the main shaft 5, has made four revolutions.

*II. Controlling stem.*—The controlling stem 90, is provided at its upper end with a turret 200, having radial cam arms 201, 202, 203, projecting therefrom. Below said turret 200, and near the upper surface of the plate 50, is the above mentioned toothed disk 205, secured to said stem 90, and adapted to have its teeth 57, engaged by the pawls 58, 72, and 74. Below the plate 50, and secured to said controlling stem 90, are a series of horizontal cams 210, 212, 216, and 218, located at different levels about said stem.

*III. Pattern wheels and pawling mechanism therefor.*—Bolted to the lug 100, which depends from the bed plate 1, is the bracket 101. Said bracket is provided at its lower end with an elongated boss 102, which forms a bearing for the shaft connected with the pattern mechanism. Journaled within said boss 102, is the sleeve 103, to the right hand end of which is secured the ratchet wheel 104, and to the left hand end of which is secured the pattern wheel 105. Journaled within said sleeve 103, is the shaft 106, to the right hand end of which is secured the ratchet wheel 107, and to the left hand end of which is secured the pattern wheel 108, as clearly shown in Fig. V.

Mounted on the top of the boss 102, is the angle bracket 110, having in the upper end of its vertical arm the stud 112. Upon said stud 112, are mounted the spring pressed locking pawls 114, and 115, arranged to engage with the teeth on the ratchet wheels 104, and 107, respectively, to prevent return movement thereof. Bearing against the inner faces of the ratchet wheels 104, and 107, is a leaf spring 120, having a bifurcated end (shown in Fig. II). The object of this spring is to retard the motion of said ratchet wheels, when they are moved step by step by their respective pawls.

Pivotally attached to one side of the bed plate 1, is the arm 122, which is provided with a stud 123, passing through a boss 124, intermediate its length. Loosely mounted upon said stud 123, are the pawls 125, and 126, which engage the ratchet wheels 104, and 107, respectively, to move said wheels step by step. Said pawls 125, and 126, are held in place on said stud by the collars 127, and 128, respectively. Extending from the depending lug 130, on said arm 122, is the back stop 131, which is adapted to move with the arm 122, and engage the under side of a tooth on either or both of said ratchet wheels 104, and 107, to prevent said wheels from moving backward while being rotated by their respective pawls. Attached to the arm 122, and bed plate 1, is the spring 133, which normally holds said arm 122, in the position shown in Fig. II.

Mounted upon the driving shaft 5, is the eccentric cam 134, which bears against the lug 130, and moves the arm 122, toward the left, and also the pawls 125, and 126, carried by said arm. A rock shaft 140, extends from the front toward the rear of the machine and is journaled in a sleeve 187, within the boss 141, formed on the bracket 101, and also in a web depending from the underside of the projecting leaf 2. Said rock shaft 140, is also supported by a depending arm 144, secured to the front edge of the plate 50. Loosely mounted upon the outer end of the rock shaft 140, are the levers 145, and 146, said levers being held between the arm 144, and the collar 147, secured to said rock shaft. Loosely mounted upon a shoulder formed on the inner face of the ratchet wheel 104, is the the bell crank lever 148, see Fig. VI, having its horizontal arm 149, bent into a right angle and provided with a pin 150, which engages a slot 151, in the lower end of lever 145. The upper end of the arm 152, of said bell crank lever 148, is beveled at 153, to engage the under side of pawl 125, to raise said pawl free from the tooth 154, of the ratchet wheel 104. The upper end of the lever 145, is provided with a stud 155, adapted to engage a cam on the controlling stem 90, as will be more fully explained.

Depending from the under side of the plate 50, is a bracket 160, having secured to its lower end the stud 161. Attached to the lever 145, near the upper end thereof is the coiled spring 162, said spring having its lower end attached to the stud 161. Loosely mounted upon a shoulder upon the inner face of the ratchet wheel 107, is the bell crank lever 170, similar to the bell crank lever 148, described above, and having one arm provided with a beveled face, similar to the beveled face 153, shown in Fig. VI. The horizontal arm 172, of said bell crank lever 170, is bent into a right angle and provided with a pin 173, which engages a slot in the end of lever 146, similar to the slot 151, in lever 145, as shown in Fig. VI. Attached to the lever 146, near its upper end is a coiled spring 176, said spring having its lower end attached to the stud 161. The pin 156, in the upper end of lever 146, is similar to pin 155, described above. Secured to the front face of the bracket 160, is a second bracket 163, which is adapted to act as a stop for the lever 145, and also for the lever 146, by the engagement of the lug 164, on said lever with said bracket. Between the bell crank levers 147, and 170, and loosely mounted upon the shaft 106, is the spacing washer 175, which maintains said levers in position.

*IV. Mechanism for controlling the half rings.*—Secured to the rock shaft 140, is the finger 180, having the pin 181, adapted to engage with the cam 218, upon the controlling stem 90, as will be more fully described. The under side of said finger 180, engages the teeth on the pattern wheels 105, and 108, as will also be more fully explained. The rocker arms 182, and 184, are also secured to the rock shaft 140, as clearly shown in Fig. IV. The sleeve 187, is journaled within the boss 141, and secured to said sleeve are two rocker arms 185, and 186. The rocker arm 185, has a pin 188, which projects into the path of the finger 180, and is adapted to be engaged thereby to raise said rocker arm 185, and with it the rocker arm 186, since both said rocker arms 185, and 186, are secured to sleeve 187, and move together. Said rocker arm 185, is also provided with a pin 189, in its outer end, said pin being adapted to coöperate with the horizontal cam 216. The bed plate 1, is provided with an annular groove 190, (shown in Fig. VIII), for the reception of two half rings 191, and 192, which form cam surfaces for controlling each half of the needles by means of a tucking cam as will be more fully explained. Mounted to depend from said half ring 191, is the stud 193, having secured to its lower end the spring-pressed plate 194. Said plate 194, is adapted to be engaged by the screws 195, and 196, in the arms 182, and 186, respectively. The half ring 192, is also provided with a stud 197, similar to stud 193, and having a plate 198, secured to its lower end. Said plate 198, is adapted to be engaged by the screw 199, in the end of the rocker arm 184.

*V. Cam mechanism for double butt needles.*—Located adjacent to the cam cylinder 9, is the pull down cam 220, secured to the arm 221, which is pivoted on the stud 222, mounted in the bracket 224, said bracket being fastened to the outside of the cam cylinder 9. The coiled spring 225, engages the arm 221, and is secured to the collar 226, which is fast upon the stud 222. Mounted in the arm 227, of the bracket 224, is the stud 228, about which the cam 230, is free to move. Said cam is circular except for the flattened side 231, and the arm 221, is kept in engagement with the periphery of said cam by means of the coiled spring 225. Upon the upper side of the cam 230, and fast thereto is the star wheel 232, having the arms 233, 234, 235, and 236. The collar 238, maintains said star wheel and cam upon the stud 228. The arms of said star wheel 232, are on a level with the cam arm 201, on the turret 200, and adapted to be engaged by said cam arm to move the pull down cam 220, into and out of operative position.

Secured to the outside of the cam cylinder 9, is the bracket 240, having the rod 241, secured in the lower end thereof. Loosely mounted upon said rod 241, are the arms 242, and 243, said arms being maintained on said rod by the collars 244, and 245, respectively. The upper end of bracket 240, is formed into two shelves 246, and 247 (Fig. III), of different levels. Mounted in the shelf 246, is the vertical stud 248, and swiveled on said stud is the eccentric 250. Around said eccentric 250, is the eccentric strap 251, having the arm 252. Fastened to the top of the arm 242, is the plate 253, having the throw up cam 254, formed on one end thereof. The arm 252, of the eccentric strap 251, is connected to the plate 253, by means of the screw 255. Upon the upper side of the eccentric 250, and secured thereto is the star wheel 260, having the arms 261, 262, 263, and 264. Said star wheel 260, and the eccentric 250, rotate together about the stud 248, and are kept in place on said stud by the collar 265. The arms of said star wheel are on a level with the cam arm 203, on the turret 200, and adapted to be engaged by said cam arm to move the throw up cam into and out of operative position. At the first revolution of the cam cylinder the cam arm 203, engages the arm 261, and gives the eccentric 250, a quarter turn to throw the cam 254, half way in; at the next revolution cam arm 203, engages arm 264, and turns eccentric 250, another quarter turn thus throwing cam 254, to its innermost position. The engagement of arms 263, and 262, draws said cam 254, out again.

The star wheel 270, having the arms 271, 272, 273, and 274, is mounted upon the shelf 247, and connected to the eccentric 275, having the strap 276, and the arm 277, similar to those described above. At the end of the arm 277, is the throw up cam 278. The arms of the star wheel 270, are on a level with the cam arm 202, on the turret 200, and adapted to be engaged by said cam arm to move the throw up cam 278, into and out of operative position. Between the brackets 224, and 240, is the bracket 280, which is bolted against the outer periphery of the cam cylinder 9. Mounted in the bracket 280, is the vertical stud 281, and mounted to swing about said stud and at different levels are the spring pressed locking fingers 282, 283, and 284. The purpose of said locking fingers is to prevent their coöperating star wheels from being progressed more than one arm at a time.

*VI. Cam mechanism for controlling needles at formation of heel and toe pockets.*—The mechanism for raising and lowering the needles which are used to knit the front half of the stocking and instep comprises the cam 290, mounted on the horizontal plunger 296, which is arranged to oscillate and reciprocate in the bracket 291, adjacent the cam cylinder 9, having the oppositely inclined cams 292, and 293, to respectively engage said cam 290, when it is oscillated from its outer normally inoperative position, to the positions for raising and lowering said needles. Said cam 290, is normally retained in inoperative position by the spring 294, in the bracket 291, pressing against collar 295, on plunger 296. The outer end of plunger 296, is provided with two projections 297, extending radially above and below it, for engagement with the respective setting cams 300, and 301, when said cams are raised and lowered. Said cams are mounted upon a slide block coöperating with the cam (not shown), which is controlled by the motion changing mechanism. When cams 300, and 301, are raised, the lower projection 297, encounters cam 301, and partly rotates plunger 296, and cam 290, so that the latter riding on cam 292, is axially shifted radially into the path of the needle hubs, which are longer than the others. Said cam 290, is provided with a recess 289, which allows the cam to escape the needles having short butts. Likewise when said setting cams are lowered, the upper projection 297, encounters cam 300, and partly rotates plunger 296, and cam 290, so that the latter riding on cam 293, is axially shifted into the path of said needle hubs in order to lower them. The rotary movement of cam 290, is limited in its lower position by the bottom of notch 298, in cylinder 9, and in its upper position by pin 299, projecting from cam face 292.

*VII. Tucking cam.*—Tucking cam 302, is secured to plate 303, which slides in slot 304, in cam cylinder 9. Plate 303, is adapted to be engaged by half rings 191, and 192, but its downward movement is limited by the engagement of pin 285, with ledge 286, formed on cam cylinder 9. Said plate 303 is provided on its upper end with a stud 305, which acts as a guide for the lower end of coiled spring 306. Mounted upon cam cylinder 9, adjacent plate 303, is post 307, having at its upper end an arm 308, from which depends stud 309, which forms a guide for the upper end of spring 307. Said spring 306, bears against the top of plate 303, and maintains said plate in contact with said half rings in order that said plate may be raised and lowered in accordance with movement of said half-rings under the control of the pattern mechanism.

Upon the interior of the cam cylinder 9, are the stitch cams 310, and 311, the top center cam 312, bottom center cam 313, the guard cams 314, and 315, and the raising cams 316, and 317, all of well known construction. The lowering cam 318, has its face 319, curved at 320, as clearly shown in Fig. XX. The object of this curve is to draw down the needle butts and project them suddenly against the guard plate 331, whereby the needles are jarred thus insuring quick and positive opening of their latches. The needle 165, is a single butt needle having a short butt and a short latch. These needles are used upon one half of the needle cylinder, and similar needles having a long butt, as indicated in full lines at 165 Fig. XVI, are used on the other half of the cylinder. The needle 166, has a single butt and a long latch. Certain of these needles have long butts similar to those of needles 165 and these needles are located similar to that indicated above. The needles 167, and 168, are double butt needles having short latches. The upper butts on the needles 167, which are located on the front half of the cylinder and knit the back half of the stocking, are on a lower level than those of 168, which are located on the back half of the cylinder. There are two kinds of upper butts on said needles 167, a short butt, as indicated at 333, and a long butt as shown at 332. The needles 168, are also provided with long and short upper butts as indicated at 177, and 178, respectively.

In Fig. XX, are shown diagrammatically the various kinds of needles employed. The butts which are shown in solid black are the long butts and those shown by a rectangle are the short butts. The long and short latches are indicated by long and short solid black lines. All the needles employed in knitting the front half of the stocking have long lower butts, and all the needles employed in knitting the back half of the stocking have short lower butts. Every other needle has a single butt, the remainder have double butts. One half of the single butt needles have short latches and the remainder have long latches. The upper butts of the needles located in the front half of the needle cylinder are at a higher level than those of the needles in the back half of said cylinder.

In Fig. XXI, is shown diagrammatically an arrangement of double-butt needles having long upper butts 332, and short upper butts 333, and so located in the cylinder as to knit two and three wale drop-stitch work.

These butts are arranged to be engaged by the pull down cam 220, and the needles are drawn down to produce open work. When it is desired to resume plain knitting, the middle needle of each group of three, being provided with a long upper butt, is thrown up first and takes a stitch, then the two outer ones are thrown up on the next revolution of the cylinder. This is accomplished by the two-stage operation of the cams 254 and 278. Where only two needles have been thrown out of action either may be provided with a long upper butt in order that it may be thrown up first. It has already been explained that the throw up cam is moved half way in when its star wheel is engaged by the radial cam arm on the turret, and then all the way in when said star wheel is engaged the second time by said cam arm. The stitch length regulating mechanism comprises the needle cylinder supporting bracket 335, which is attached at its upper end to the ring 336, upon which the needle cylinder rests. The lower end of said bracket 335, is attached to a plunger 337, arranged to slide within the split boss 338, on the bed plate 1, provided with the clamping screws 339. The frame plate 340, is secured to the lower end of the plunger 337, by a screw and is prevented from turning by a pin projecting from the bracket 335, into a lug on said plate 340. The eccentric shaft 341, is journaled in lugs 342, depending from the under side of said plate 340, and is provided with an eccentric strap 343, held in place by a cap plate 344, retained in the end of the shaft by the screw 345. Said eccentric strap has an upwardly extending pitman with a box 346, embracing the block 347, pivoted on the stud 348, extending from the boss 338. When the eccentric shaft 341, is rotated it is moved vertically by the eccentric and thereby raises or lowers all the members carried by it including the bracket 335, supporting the needle cylinder, so that the length of the stitches or loops in the fabric may be thus varied by relative movement of the needles and sinkers. Upon the shaft 341, is secured the lever 350, having one end 351, arranged to be shifted upward by a high side link in the measuring chain, and said lever is arranged to be shifted downward by a high side link in the measuring chain encountering the lever 352, fulcrumed on the stud 353, and pivotally connected to the lever end 351, by the screw link 354, extending from the pin 355, on said lever 351, through the rotary stud 356, on said lever 352. The rocking movement of the eccentric shaft is limited by the set screws 357, and 358, arranged to engage the lever arm 350. In starting the stocking all of the needles are in action and follow the ordinary stitch path. In order to knit open work it is necessary to throw some needles out of action.

in this case every other one or every double butt needle. This is done by cam 220. When the foot is reached one-half of the double butt needles are raised thus knitting plain the lower half of the foot, and for this purpose the upper butts on this half of the cylinder are on a different level from those on the other half of the cylinder and can therefore be affected only by cam 254, at that level.

In the drawings, the various parts are shown in the position which they assume while the machine is knitting the foot. The high side link 321, of the measuring chain 91, has just passed under the arm 86. The pin 155, in the upper end of lever 145, is resting on the horizontal cam 212, thus depressing the lower end of said lever 145, and also the outer end of the arm 149, whereby the beveled upper end 153, of the arm 152, of the bell crank lever 148, engages the pawl 125; said pawl 125, thus being caused to reciprocate idly on said end 153, and on the flattened tooth 154, on the wheel 104, whereby said wheel remains stationary. The pin 156, in the upper end of the lever 146, has descended from the horizontal cam 210, and the lug 164, is resting upon the bracket 163, thus limiting the descent of this end of said lever. The lower end of said lever 146, is therefore raised and the beveled face 171, of the bell crank lever 170, is lowered, thus allowing the pawl 126, to engage the teeth upon the ratchet wheel 107, and step said wheel around one tooth at a time. Thus the pattern wheel 105, which is connected to ratchet wheel 104, by means of the sleeve 103, is stationary, while the pattern wheel 108, which is connected to the ratchet wheel 107, by the shaft 106, is stepped around.

The pin 189, rests upon the horizontal cam 216, and the arm 185, is raised as shown in Fig. V. The arm 186, is therefore also raised and with it the plate 194, and the front half ring 191. The pin 181, in the outer end of the arm 180, has descended from the horizontal cam surface 218, and the under side of said arm 180, engages the periphery of the pattern wheel 108, in the depression 322. While said arm 180, is in a depression on said wheel 108, the arm 184, which is connected to said arm by the shaft 140, is also lowered and allows the half ring 192, to assume its lower position. Thus the tucking cam 302, is lowered as shown in Fig. XX, and the long latched needles allow the desired number of stitches to be collected upon them until said arm 180, ascends the tooth 323, which causes the half ring 192, and the tucking cam 302, to be raised, whereupon the long latched needles are raised sufficiently to free their latches and cast their collected stitches. During the traverse of the tooth 323, under said arm 180, a series of plain courses are knit. The front half ring 191, which controls the needles which knit the bottom of the foot, is maintained in its elevated position during the entire knitting of the foot, thus causing plain knitting to be produced upon this half of the foot. The length of the tuck stitches and the number of courses thereof are determined by the size and location of the teeth on the pattern wheel 108.

When the open-work of the tube for the foot has been knit the high side link 324, passes under the arm 86, rocking the shaft 83, and arm 82, thereby pulling link 81, toward the rear and withdrawing the cam 76, so that the pin 53, may be engaged by the hook 44, to operate the pawling mechanism which rotates the controlling stem 90, once to bring the cam arm 202, into engagement with the star wheel 270, to step said star wheel around to move the cam 278, into operative position to raise needles 168, then said star wheel is stepped around to withdraw the cam 278. At the same time finger 180, is raised through the action of the cam 218 on the controlling stem 90 and causes finger 184, to be raised, which raises plate 198, and half ring 192, and after this cam is withdrawn, the controlling stem 90, is pawled another tooth, whereupon a few courses of plain knitting with all the needles in action are formed. Then the toe pocket is knit in a well known manner, whereupon, a new stocking may be commenced.

The high links 326, and 327, next pawl the controlling stem 90, but the other conditions remain unchanged. Link 328, causes stem 90, to be pawled, whereupon, cam 212, is rotated, releasing pin 155, in the upper end of arm 145, causing arm 149, of bell crank lever 148, to be raised and in turn causing arm 152, of said lever 148, to fall, allowing ratchet 125, to pawl wheel 104, and cause pattern wheel 105, connected thereto to also rotate. At this time cams 216, and 218, free fingers 180, and 185, to drop onto pattern wheel 105, causing alternate raising and lowering of half rings 191, and 192, and producing tuck work according to the teeth on pattern wheel 105. On this wheel the depressions cause the half rings to be lowered to produce tucking and the high portions control the half rings to produce plain knitting. These high portions are alike and equally spaced around the periphery of the wheel thus producing a uniform pattern. This tucking is proceeded with until the high link 329, engages arm 86, when the stem 90, is pawled twice. The cam arm 201, is first brought into position to bring the pull down cam 220, into action to pull down all of the double butt needles. The cam arm 201, is then swung out of action when the stem 90, is pawled the second step. The machine now produces open tuck-work all around the leg of the stocking, and the pattern is controlled by the pattern wheel 105. At this point the high side link 360, engages the under side of the lever arm 351, thus throwing this arm up and lowering the plunger 357, and the bracket 335, together with the needle cylinder to shorten the stitches. This length of stitch continues until the high side link 361, engages the arm 352, which pulls down the arm 351, and moves the eccentric to raise the needle cylinder and lengthen the stitches. Next the high side link 363, engages the lever 351, to again lower the needle cylinder to shorten the stitches. This continues until the link 330, engages the arm 86, whereupon the stem 90, is pawled once. The pin 155, in the lever 145, has mounted the horizontal cam 212, thereby causing pattern wheel 105, to be thrown out of action, and the pin 156, on the lever 146, has descended from the cam 210, thereby freeing said lever to throw the pattern wheel 108, into action. The machine now knits open tuck-work and the pattern is varied according to the teeth upon said pattern wheel. This continues until the high link 321, engages the arm 86 whereupon the stem 90, is pawled once, the cam arm 203, steps the star wheel 260, around to throw the throw up cam 254, into and out of action, which raises the double butt needles which knit the bottom half of the foot. The pin 189, on the rocker arm 185, engages the horizontal cam 216, thus raising the arm 186, and the front half ring 191. The plain stitches are knit upon the bottom of the foot and open-work and tuck-work in the upper half of the foot. This continues until the high link 324, engages the arm 86, whereupon the stem 90, is pawled twice. The pin 156, on the lever 146, engages the horizontal cam 210, the lower end of said lever is lowered and the ratchet wheel 107, and pattern wheel 108, are put out of action by the raising of the pawl 126, by the beveled end 171, of the bell crank lever 170. The pin 181, on the crank arm 180, engages the cam 218, thus raising said crank arm 180, and also the crank arm 184, together with the back half ring 192. The crank arm 202, operates the star wheel 270, to throw the cam 278, into and out of action, said cam raising the remainder of the double butt needles, and the machine resumes plain knitting. The high side link 364, engages the arm 352, which moves the lever arm 351, downwardly and turns the eccentric shaft to raise the needle cylinder and lengthen the stitches.

The thread feeding mechanism may be of any desired form, and as it forms no part of my present invention, and various forms thereof are well known, I have not deemed it necessary to illustrate any specific form.

In the production of multiple drop stitch work it has heretofore been found difficult to again resume plain knitting for the reason that adjoining needles would form a single loop which would run down a portion of the stocking, if said needles were brought up simultaneously. This is believed to be due to the fact that the sinkers between the needles would not act to guide the thread for the formation of a single stitch upon each needle. By throwing into action adjoining needles in successive courses, they readily pick up their stitches to resume plain knitting. As one means for accomplishing this we have provided the needles with long and short butts and arranged in suitable groups as indicated in Figs. XIV, and XXI, but our invention is not limited to such means. As a convenient means for raising the needles upon the resumption of plain knitting, the cam 254, is provided and operated by the star wheel 260. For turning said star wheel a cam arm (as shown in Fig. XIV), is mounted on a turret, and adapted to engage the arms of the star wheel to step it around. The extremity of the cam arm is so shaped that its foremost corner engages one arm of the wheel to give it a partial rotation, and the rear corner of the cam arm acts as an abutment for the next wheel arm to limit the extent of rotation of said wheel. By moving the cam in step by step, the long butt needles will be first engaged and raised into operative position after which the short butt needles will be engaged and raised into operative position. Thus, we are able to raise the adjacent needles which have been thrown out of action to produce the drop stitch knitting one at a time, or in succession.

By the above described device, a stocking may be knit, having at the top a plurality of courses of plain knitting. This is accomplished by all the needles being brought into action. The split rings 191 and 192 are both raised and held in raised position by the cam on the stem 90. The clearance or tucking cam 302, is raised by means of the split rings and operates upon the butts of the long latch needles, to raise the same sufficiently to knit. After having knit the desired length of plain knitting the pattern chain may be so constructed as to throw into operation the stem 90, which in turn will cause the pattern wheels 105 and 108 to be operated. The turning of the stem 90 will also cause the cam thereon to release the rings 191 and 192, so that they may be operated upon, and raised and lowered by the pattern wheels. Said rings as they are raised up and down by the pattern cams will raise and lower the tucking or clearance cam 302. When the split rings are raised, the needles controlled thereby will operate to knit and when the split rings are lowered the needles controlled thereby, will retain the thread, thus forming a tuck stitch. Said split rings may be held lowered for two, three or four courses as desired, depending upon the shape of the pattern wheel before they are raised, to cause the needle to shed their loops. As shown in Fig. 20, every fourth needle is a long latch needle, except at a small portion of the cylinder where it is desired to knit the center of the back of the stocking where all the needles are short latch needles. Therefore, the tuck stitch will extend substantially around the entire leg of the stocking.

Lace work may now be knit by combining with a tuck stitch, a drop stitch. This is accomplished by means of the cam 220 which is controlled by the stem 90. When the cam 220 is thrown in, it engages all the upper butts of the needles throwing down the corresponding needle to an inoperative position.

In the arrangement shown in Fig. 20 every other needle has an upper butt except the portion knitting the center and back of the stocking and consequently every other needle is thrown out of action. Only the short latch needles have upper butts so that every other needle is now a long latch needle. Lace work will be done by raising and lowering the split rings in the manner above described. The lace work may be followed if desired, by plain drop stitch knitting. This is accomplished by raising the split rings 191 and 192, while every other needle is out of action and the holding of said rings raised. Inasmuch as both the rings are raised, the clearance cam will operate to lift the long latch needles so that all the needles will knit, but as every other needle is out of action, drop stitching is produced. The split rings may in this instance be controlled by either of the pattern wheels or by the cam on the cam stem 90 through the rock shaft 140. By varying the pattern chain I may make various patterns of knitting, consisting of plain knitting, drop stitch knitting, tucking or lace work, following one after the other in any desired relation.

When the heel is reached, it is desirable to produce plain knitting on the rear of the stocking and to continue the drop stitch knitting or tucking or lace work on the front part of the stocking. This is accomplished by throwing in the cam 254 which is controlled by the stem 90 through the radial arm 203, and the star wheel 260. This cam will engage only the butts 332 and 333 of the needles 167, that is, the lower upper butts. These needles will be raised into operative position by the cam 254. If the needles are provided with long and short butts, the step by step movement of the cam toward the cylinder will cause first the long butt needles to be raised and then the short butt needles to be raised. The split ring 191 is also raised so that the clearance cam 302 when in engagement with the ring 191, will raise the long latch needles so as to shed their loops and plain knitting will be performed upon all the needles in the rear section of the cylinder. When the clearance cam 302 is in engagement with the ring 192, which has not been permanently lifted, tuck stitches may be made on the needles on the front half of the needle cylinder. This operation of plain knitting on one half of the stocking and tuck stitching the other half, may be continued throughout the body portion of the foot of the stocking. It is desired to knit the toe portion plain. This is accomplished by the cam 278 being thrown in, which will engage the butts 177 and 178 of the needles 168, and raise said needles into operative position. If certain of the needles are provided with long butts, the cam will through its step by step movement toward the cylinder, raise first the needles with the long butts, and then the needles with the short butts, so that adjacent needles which have been thrown out of operation may be brought one after another or in succession into operation. A split ring 192 is also raised and the clearance cam operates upon all the long latch needles, and therefore, all the needles are knitting.

In Fig. XXII we have shown one form of stocking which may be knitted on our improved machine. The blackened portions in this figure represent plain knitting, using all of the needles throughout said blackened section. The portions marked 400 are all plain knitting, in which only one-half of the needles are employed, thereby producing an open or lace effect. The portions marked 401 are all heavy tuck stitches, and the portions marked 402 are all comparatively lighter tuck stitches. During the knitting of the portions 400, 401, 402 only one-half of the total number of needles are employed. The bands 404, 405 are also formed of heavy tuck stitches, but here all the needles are employed and the fabric in this region has an elastic or garter effect. It is also to be noted that a strip of plain knitting extends down the entire back of the stocking. While this figure shows one product which may be made on our improved knitting machine, it is obvious that the controlling patterns may be varied, and the resulting product similarly varied.

Having thus described our invention, we claim.

1. In a circular automatic stocking knitting machine, the combination of a series of needles having alternately long and short butts, means coöperating with said needles whereby adjacent needles may be thrown out of action for producing drop stitch knitting, a cam for throwing said needles into action, and means for moving said cam whereby first the needle with the long butt is thrown into action, and then the needle with the short butt.

2. In an automatic circular knitting machine, the combination of a series of double butt needles; means for engaging the upper butts of said needles for throwing the same into and out of operation; a controlling stem provided with means for operating said means; pattern mechanism controlled by said stem; and a second pattern mechanism coöperating with said controlling stem.

3. In an automatic circular knitting machine, the combination of a group of single butt and a group of double butt needles; means for putting the double butt needles out of action; means for bringing one half of said double butt needles into action; and means for controlling one half of the single butt needles to produce tuck work.

4. In a circular knitting machine, the combination of a pattern mechanism, a controlling stem, means for operatively controlling the stem, said means being controlled by the pattern mechanism, a needle cylinder having two sets of needles, and means controlled by said stem for operating said sets of needles independently, said means including vertically movable members, one of which coöperates with each set of needles, said members being so formed and controlled as to be moved independently.

5. In a circular knitting machine, the combination of a pattern mechanism, a controlling stem, a pawling mechanism for turning said stem, means for controlling the pawling mechanism from said pattern mechanism, a needle cylinder having two sets of needles, and means controlled by said stem for operating each set of needles independently for producing tucked work, said means including vertically movable members, one of which coöperates with each set of needles, said members being movable independently of each other.

6. In a circular knitting machine, the combination of a pattern mechanism, a controlling stem, means for operatively controlling the stem, said means being controlled by the pattern mechanism, a needle cylinder having two sets of needles, and means controlled by the stem for operating said sets of needles independently, said means including split rings movable independently of each other, devices controlled by the rings for operating the needles, one of said rings coöperating with each set of needles.

7. In a circular knitting machine, the combination of a controlling stem, a series of cams upon said stem, a needle cylinder having two sets of needles, a plurality of ring sections disposed upon opposite sides of the cylinder for the action of said needles, means for raising the ring sections independently or simultaneously, and pattern mechanism brought into action by the cams for controlling the movements of the said ring raising means.

8. In a circular knitting machine, the combination of a controlling stem; a pair of pattern wheels; means controlled by said stem for progressing said pattern wheels independently; a tucking cam; a plurality of ring sections for controlling said cam; a rock shaft; and means on said rock shaft operatively related to said pattern wheels for controlling the movement of said ring sections.

9. In a circular knitting machine, the combination of a controlling stem; a pair of pattern wheels; means controlled by said stem for progressing said pattern wheels independently; a pair of levers operatively related to said controlling stem; means connected to each lever for rendering the corresponding progressing means inoperative; a tucking cam; a plurality of ring sections for controlling said tucking cam; a rock shaft; and means on said rock shaft coöperating with said pattern mechanism for controlling the movement of said ring sections.

10. In a circular knitting machine, the combination of a needle cylinder carrying a series of needles; a cam cylinder; a pull down cam on said cam cylinder having a concave face; and a guard plate adjacent said cam for engaging the butts of the needles to jar open their latches.

11. In a circular knitting machine, the combination of a needle cylinder carrying a series of needles; a cam cylinder; a pull down cam on said cylinder having a concave face for engaging the needle butts and projecting the needles downwardly; and a guard plate located below said cam to receive the impact of the needle butts to jar open the latches of said needles.

12. In a circular knitting machine, the combination of a controlling stem; a series of teeth around said stem; a lever, a pawl pivoted to said lever; a safety catch pivoted adjacent said stem and controlled by said lever to engage a tooth on said stem to prevent said stem from being rotated too far; and a locking pawl for preventing said stem from turning backwardly.

13. In a circular knitting machine, the combination of a controlling stem; a series of teeth around said stem; a lever; a spring pressed pawl pivoted to said lever; a safety catch pivoted adjacent said stem; and having a projection for engaging the teeth on said stem to prevent said stem from being rotated too far, said catch also having a finger for engaging said lever; a locking pawl for preventing said stem from turning backward; and means for operating said lever.

14. In a circular knitting machine, the combination of a controlling stem; a series of teeth around said stem; a lever; a spring pressed pawl pivoted to said lever; a safety catch pivoted adjacent to said stem and having a projection for engaging the teeth on said stem to prevent said stem from being rotated too far, said catch also having a finger for engaging said lever; a locking pawl for preventing said stem from turning backward; and automatic means for operating said lever.

15. In a circular knitting machine, the combination of a controlling stem; a series of teeth around said stem; a lever; a spring pressed pawl pivoted to said lever; a safety catch pivoted adjacent said stem and having a projection for engaging the teeth on said stem to prevent said stem from being rotated too far, said catch also having a finger for engaging said lever; a locking pawl for preventing said stem from turning backward; means for operating said lever; pattern mechanism; and means controlled by said pattern mechanism, for operating said lever.

16. In a circular knitting machine, the combination of a controlling stem; a series of teeth around said stem; a lever; a spring pressed pawl pivoted to said lever; a safety catch pivoted adjacent said stem; and having a projection for engaging the teeth on said stem to prevent said stem from being rotated too far, said catch also having a finger for engaging said lever; a locking pawl for preventing said stem from turning backward; means for operating said lever; pattern mechanism; means normally preventing the automatic operation of said lever; and means controlled by said pattern mechanism for removing said preventive means.

17. In a circular knitting machine provided with needles, means for withdrawing groups of two or more needles from action for the production of multiple drop stitches; and means for restoring said needles to action at the termination of the drop stitch by the throwing into action of adjoining needles in successive courses.

18. In a circular automatic knitting machine, the combination of a set of double butt needles, a second set of double butt needles having their butts spaced a greater distance than the first set, and independently operating means operating upon the upper butts of said needles for returning one set into operative position independently of the other.

19. In a circular automatic knitting machine, the combination of a set of double butt needles, a second set of double butt needles having their butts spaced a greater distance than the first set, means common to all the butts for lowering the needles to render them inoperative and independently operating means for coöperating with the upper butts of the needles for raising said sets into operative position independently of each other.

In testimony whereof, we have hereunto signed our names at Philadelphia, Pennsylvania, this second day of March, 1908.

JOHN B. PAXTON.
JOSEPH T. PAXTON.

Witnesses:
JAMES H. BELL,
E. L. FULLERTON.